Patented May 27, 1924.

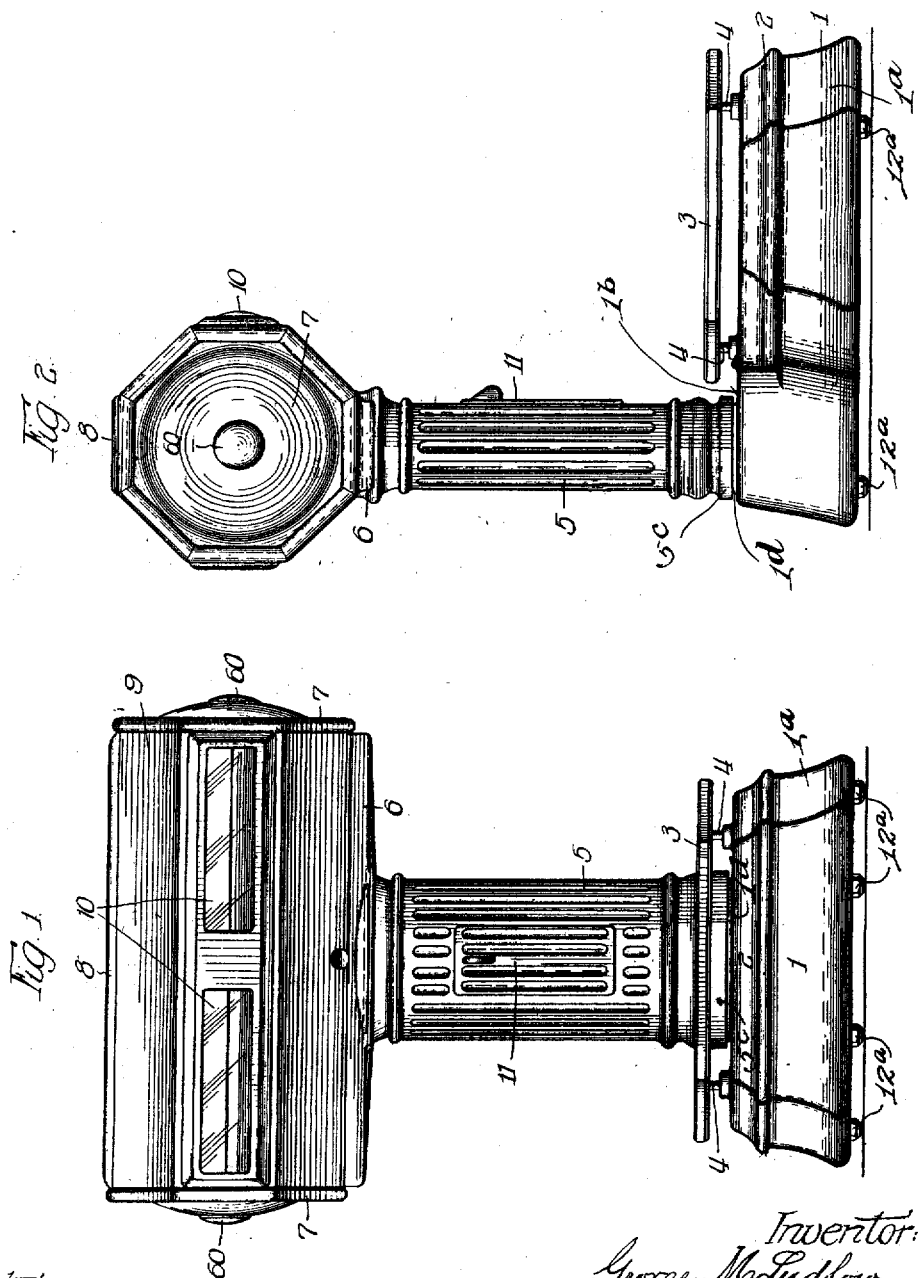

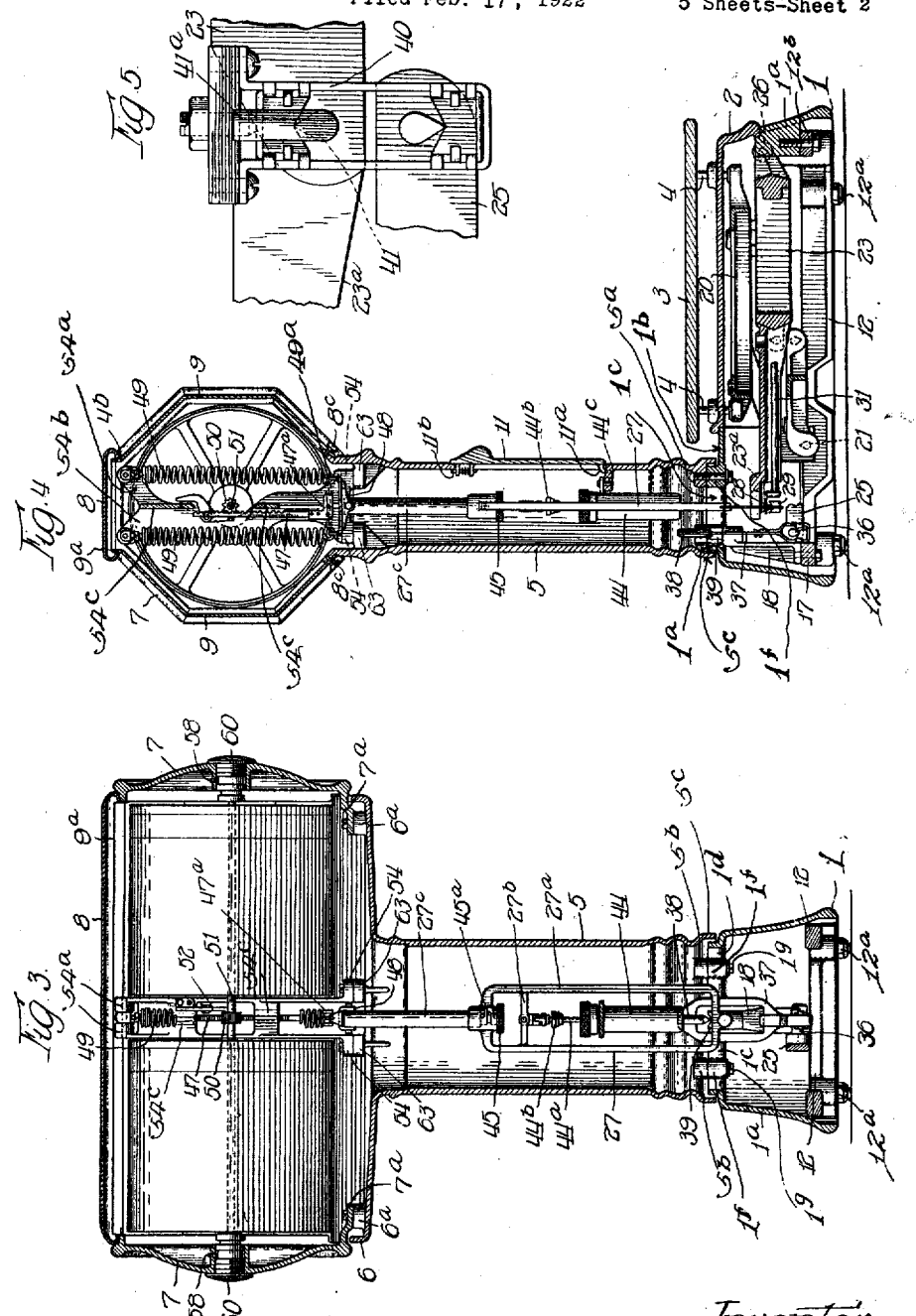

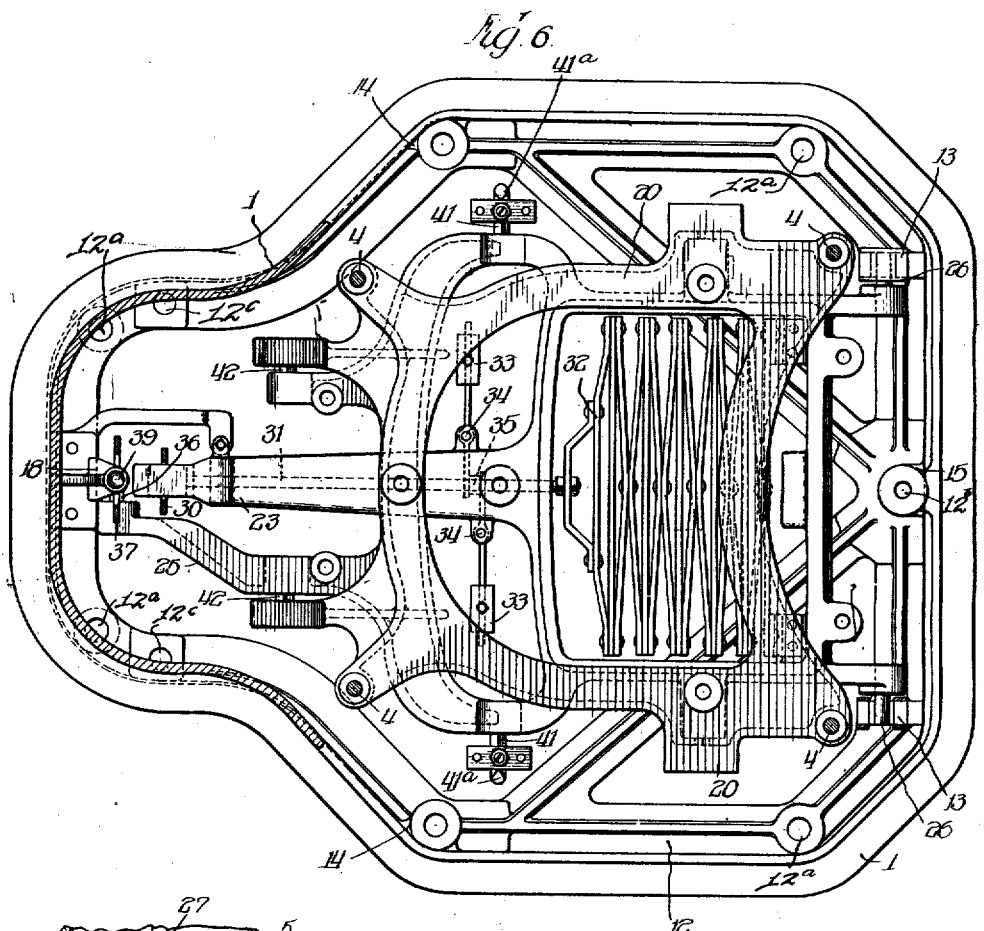

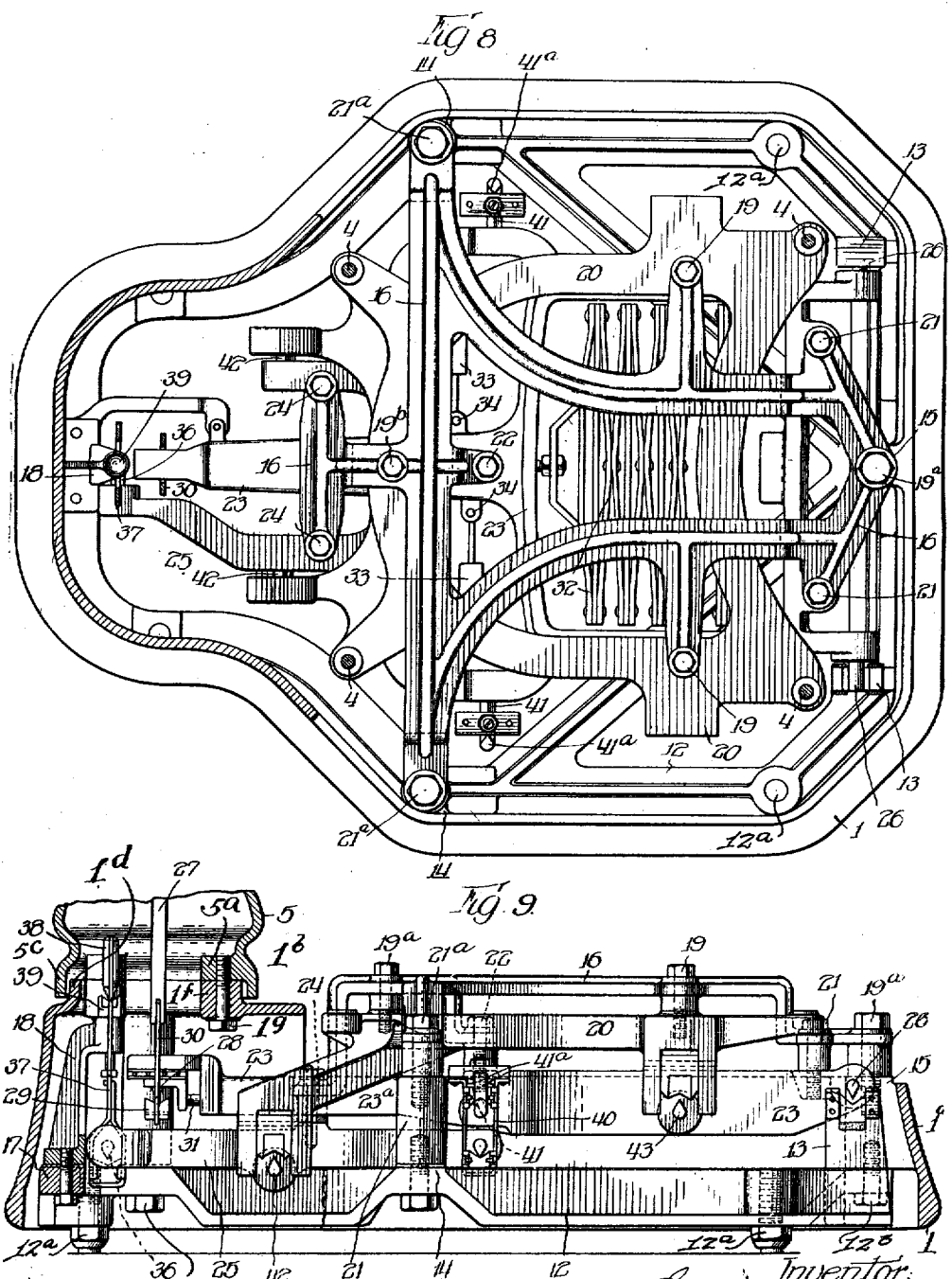

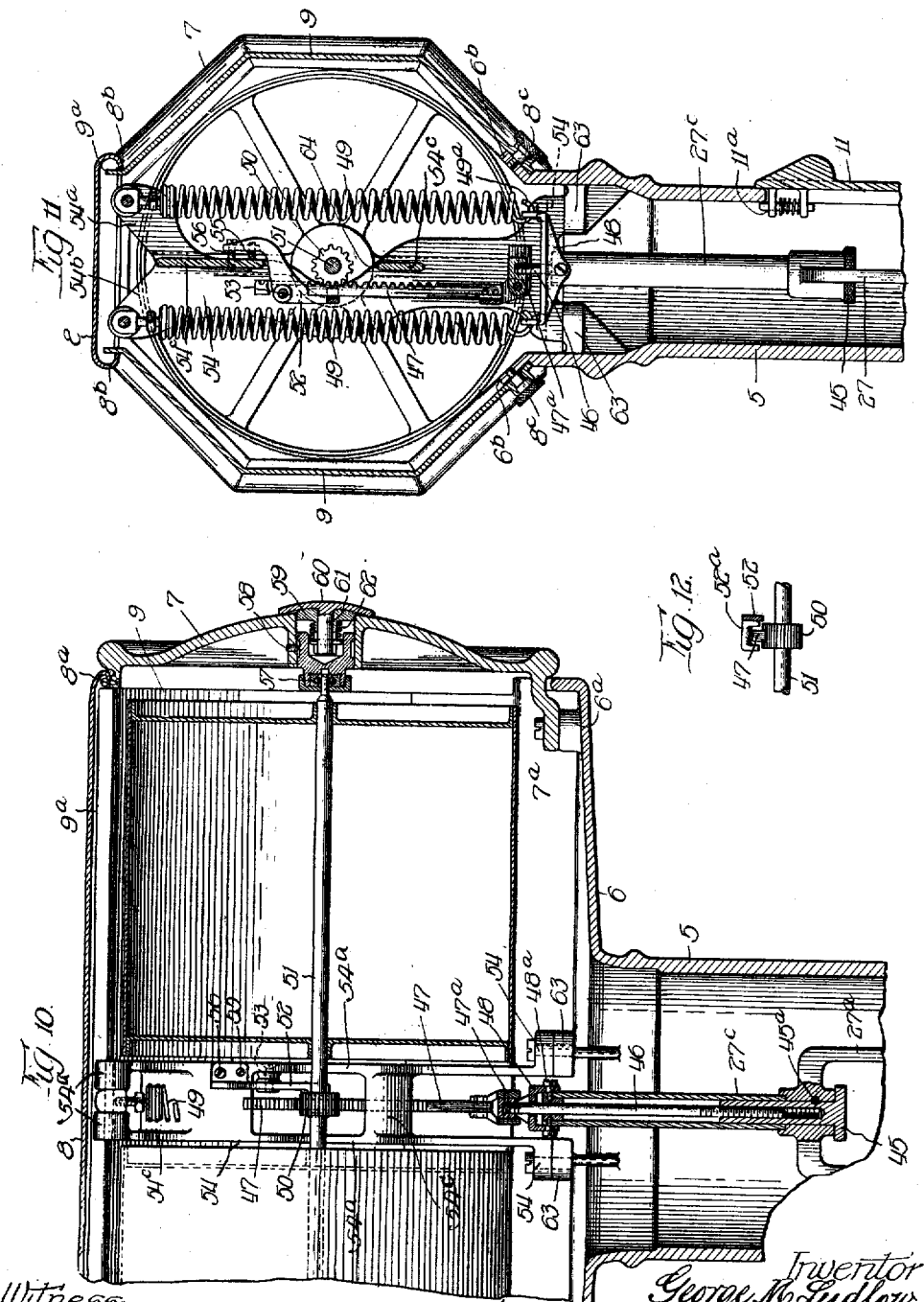

1,495,754

UNITED STATES PATENT OFFICE.

GEORGE M. LUDLOW, OF EVANSTON, ILLINOIS, ASSIGNOR TO SANITARY SCALE COMPANY, OF CHICAGO, ILLINOIS, A CORPORATION OF ILLINOIS.

COMPUTING-SCALE MECHANISM.

Application filed February 17, 1922. Serial No. 537,315.

*To all whom it may concern:*

Be it known that I, GEORGE M. LUDLOW, a citizen of the United States, residing at Evanston, in the county of Cook and State of Illinois, have invented certain new and useful Improvements in Computing-Scale Mechanism, of which the following is a specification.

While some of its features are adapted for more general use, the present invention is designed primarily for embodiment in computing scales of that type in which the loading mechanism, consisting of a system of levers and platform, is mounted in a supporting base, and the translating and indicating mechanism, including a rotary chart and means for converting vertical reciprocatory motion into rotary motion are located in a chart housing, elevated upon a supporting column above the base.

One object of the invention is to construct the scale housing, consisting of base, column, and chart housing, in a manner to permit these elements to be surfaced with vitreous glazing and to be assembled into rigid supporting relation without injury to the surface glazing; also to better adapt these elements of the casing to mount and support the elements of the scale mechanism to be located within them; also to render said casing elements, and particularly the chart housing, more rigidly self sustaining under the stresses imposed upon it in use, and therefore better adapted to maintain accurate relation of the working parts maintained within it. To these ends, one feature of the invention consists in constructing the base with column centering and supporting steps which sustain the column upon the base without bringing the edges of the glazed external walls or surfaces into impingement one against another; providing a pair of main fulcrum pillars for the main lever; providing steps for supporting and screwing down a shipping spider which is adapted to lift all of the levers from their bearings and float them immovably during shipment of the scale; and providing a step for a crane that supports a universally pendulous fulcrum for an auxiliary or check lever; also in providing upon the upper end of the column a rigid flanged T-head within the marginal end portions of which are located supporting lugs for end members of a chart housing, and along the longitudinal margins of which are flanges or stiffening webs which receive and hold side walls of such housing, while within said lateral marginal flanges and in effect, directly upon the column, are formed steps for rigidly supporting a counterbalancing spring standard; also in providing a chart housing consisting of an essentially rectangular frame, the end members of which, bolted to and upstanding from the supporting lugs of the column T-head, are in the form of rigid polygonal frames adapted to carry and accurately present bearings for a rotary chart, and the top cross rail or bridge plate of which constitutes the upper wall of a prism rigidly united to the end walls and spacing them apart, while the side walls of the housing, extending longitudinally between the end walls and enclosing the spaces between the top plate and the T-head of the column, are interengaged at their upper edges with the top plate and releasably interlocked at their lower edges with the flanges of the T-head; these several elements of the chart housing being brought into bearing one upon the other in a manner to avoid chipping or impairing the vitreous enamel surfacing with which the parts are provided.

Another object of the invention is to provide an improved construction of scale, particularly with respect to the means for mounting and supporting the lever system, the manner of mounting the base housing which surrounds the lever system, and the manner of supporting the counterbalancing mechanism and appurtenant parts on the base housing; and to this end, a further feature of the invention consists in mounting the lever system upon a sub-base which is provided with its own immediate legs or supports by which it stands directly upon a surface, and having the various lever bearings mounted immediately upon this sub-base, which thus becomes a readily machined and carefully constructed element of the scale; the sub-base being assembled with the base housing in a manner to support the housing upon the sub-base as distinguished from standing the housing upon the surface and suspending the sub-base within it; and weighing mechanism being mounted in an upper housing which is supported upon the base housing, and preferably spaced therefrom through the medium of a hollow column through which the weighing connections extend.

Another object of the invention is to provide an improved lever system for the base of a scale; and to this end, a further feature of the invention consists in constructing, for the support of the loading platform, a main lever comprising a frame having fulcrums at its rear end and a load transmitting tongue extending forwardly from the frame to a point centrally and vertically beneath the column; also an auxiliary or check lever supported at its rear end upon an intermediate portion of the main lever through links horizontally spaced apart in a direction transverse to the main lever so that the compensating lever tends to maintain proper alignment with the main lever, and having its forward end suspended by a universally pendulous single point fulcrum which permits said compensating lever to respond to all longitudinal, transverse, or torsional stresses imparted through the main lever; the platform being supported on the main and check levers through the medium of a pair of transversely spaced bearings on each lever located between the fulcrum of the lever and the aforesaid lever connecting links, and further tending, through such spaced bearings, to maintain alignment of the universally fulcrumed check lever with the main lever.

A further object of the invention is to provide a universally pendulous fulcrum for an auxiliary or check lever in a lever system of the kind referred to, and to this end a further feature of the invention consists in providing an elevated pivot point step, preferably through the medium of a supporting crane upstanding from a step on the front end of the base, and mounting upon said pivot point step a universally rocking pin carrying a depending sling, in the lower end of which are mounted supporting agates or the like for a knife edge bearing at the forward end of a check lever.

A further object is to provide a lever system for platform scales which will be very much more sensitive and accurate in the transmission of load from the platform to the weighing mechanism. Accordingly, a further feature of the invention consists in combining with the main lever that is fulcrumed at its rear end and has transmitting connection at its forward end, a check lever which is fulcrumed at its forward end and connected at its rear end with an intermediate portion of the main lever, and a platform spider which has a bearing directly upon the main lever at a point between the fulcrum of the main lever and the said intermediate portion, and a bearing on the check lever intermediate of the fulcrum of the check lever and its connection with the said intermediate portion of the main lever; the rear end of the platform being offset rearwardly with reference to the bearing on the main lever a distance sufficient to substantially increase the proportion of load which is imposed directly upon the main lever over that which is imposed indirectly thereon through the check lever; and the forward end of the platform spider through which load is imposed on the check lever being offset from the body of the spider a distance sufficient to further insure reduction of the load indirectly transmitted through the check lever, so that the loading effect of the platform is largely that of a single point bearing on the main lever, and the function of the check lever is largely that of a balancing link with avoidance of the disadvantage of the balancing link, in that the load which it bears is largely transmitted to the main lever, and the check lever can be left under complete control of the main lever in determining its horizontal position by reason of the single point pendulous fulcrum of the check lever.

In carrying out this part of the invention, the single point universally pendulous fulcrum of the check lever is located forward of the forward end of the main lever, and preferably the bearings through which the platform load is imposed directly and indirectly upon the main lever are more remote from the lever fulcrums than has been usual in known constructions, so that the lever system is very much more sensitive and loads are very much more accurately reflected in the weighing mechanism. For instance, the check lever extends from its floating fulcrum well forward of the forward end of the main lever, rearwardly to a point beneath the middle of the main lever, where it is linked to the latter; the direct bearing of the platform spider upon the main lever is at a point intermediate of the fulcrum of the main lever and the said middle point of the main lever; the indirect loading point through which the platform spider bears on the check lever is at the middle of the latter; and the platform spider is constructed with platform supporting posts in such relation to the main and check lever spider bearings that while on the one hand the rear platform posts stand well to the rear of the main lever spider bearings and balance the greater part of the platform load over the main lever spider bearings, yet on the other hand the forward extension of the platform spider is quite sufficient to counterbalance the load and prevent up-tipping of the forward end of the platform spider, even though a load equal to the capacity of the scale be placed on the rear end of the platform. It is to be understood, however, that while these proportions are desirable, they may be departed from without yielding the more important novel characteristics of the lever system, which are the rearward offsetting of the platform to bring it into unsymmetrical relation to the direct and indirect loading bearings, thereby imposing the load mainly on the direct loading bearing of the main lever, and the location of the single point universally pendulous fulcrum of the check lever forward of the forward end of the main lever.

A further object of the invention is to provide means for floating the main and auxiliary levers, as well as the platform spider separately and individually, from their bearings and from each other and holding them rigidly out of bearing or in floating position by engagement of each member at a plurality of points which determine its plane during shipment of the scale, thereby preventing injury to the bearings that might result from shocks or jars; and to this end a further feature consists in providing what I shall herein term a "shipping spider" having feet or projections through which it is adapted to enter into bearing upon and to be screwed to a sufficient number of steps upon the base frame to accurately define a fixed plane of the spider, and lifting feet or projections presented in position to be united by screws or other conveniently removable means at a sufficient number of points, preferably three on each of the platform and levers, to lift them from their bearings and rigidly hold them in fixed planes.

A still further object of the invention is to provide an improved arrangement of dash pot for a scale of the character described; and to this end a further feature consists in developing the lower portion of a steelyard rod into a frame or open structure within which is supported, through the medium of a bracket in the column of the casing, the cylinder of the dash pot, the piston of which is connected with the frame of the steelyard rod, as, for instance, through the medium of a cross bar therein, while the lower end of such frame carries a stirrup which supports the agate bearing for the forward end of the main lever tongue, and the upper end of said steelyard rod frame embraces the adjusting screw for zeroizing the scale.

A still further object of the invention is to improve the construction of the yoke through which the upper end of the steelyard rod is connected to the counterbalancing springs; and, accordingly a further feature consists in pivotally mounting the yoke upon the upper end of the steelyard rod and having its ends connected with the respective springs of the counterbalancing element.

A still further object is to improve the construction of the translating mechanism, and, accordingly, a further feature consists in pivotally mounting the transmitting rack upon the upper end of the steelyard rod, or the vertically adjustable portion of said steelyard rod, and holding the same into bearing upon the pinion which it is to rotate through the medium of a presser foot pivoted upon the standard which supports the counterbalancing elements, with one end of the presser foot engaging the pivotal rack bar and holding it into mesh with the pinion, and with the other end controlled by set screw and binding screw in a manner to hold it fixedly, but with very accurate and minute adjustment.

A still further object is to adapt the chart housing, counterbalance support, and translating mechanism in a scale of the character described to permit ready removal and replacement of the rotary chart employed therein without impairment of the adjustments or dismantling or disassembly of parts coacting with the chart; and to this end, a further feature consists in locating the translating mechanism, with its adjustable presser foot, on the opposite side of the chart shaft from a movable wall of the chart housing, and cutting away the counterbalance supporting column to admit the shaft from said open side of the housing.

Further objects and features of the invention relate to improvements in the details of construction of the several elements which enter into the organization generally outlined above, and will appear from the following detailed description.

In order that the invention may be fully understood, the preferred embodiment thereof has been illustrated in the accompanying drawings.

In said drawings—

Figures 1 and 2 are, respectively, a front elevation and a side elevation of the scale completely encased.

Figure 3 is a vertical section in a plane passing through the axes of the column and chart housing, and showing the plates within the same in front elevation.

Figure 4 is a central vertical section through the entire casing in a plane at right angles to Figure 3, showing the lever system in section and motion transmitting and translating elements in side elevation.

Figure 5 is a detail view of one of the pair of link connections through which the rear end of the compensating lever is suspended from an intermediate portion of the main lever.

Figure 6 is a top plan view of the platform and lever system, together with the base and base frame.

Figure 7 is a central vertical longitudinal section through the base with the platform and lever system, together with the supporting frame shown in side elevation.

Figure 8 is a view similar to Figure 6 with the shipping spider in position.

Figure 9 is a view similar to Figure 7 with the shipping spider in position but with the cover of the base removed and showing the platform and levers lifted from their bearings.

Figure 10 is a vertical axial section on an enlarged scale of the chart housing, a portion of the chart, a chart bearing, and the zeroizing adjustment for the steelyard rod.

Figure 11 is a vertical transverse section on an enlarged scale of the chart housing and upper portion of the column, showing in elevation the counterbalancing and translating mechanism, as well as the adjustable portion of the steelyard rod connection; and Figure 12 is a detail view of the translating connection in horizontal section immediately above the chart pinion.

1 represents the base having a removable cover 2, and 3 represents the loading table supported through studs 4 upon a loading platform within the base as hereinafter described. Base 1 comprises the surrounding wall 1$^a$ and the raised deck 1$^b$ at its forward end, formed with an upwardly presented opening 1$^c$ for the passage of weighing connections and other scale parts, said opening being defined by an upstanding flange 1$^d$. 5 represents the column supported upon said raised deck of the base 1, and with its lower margin suspended around the upstanding flange 1$^d$ through the medium of internal lugs 5$^a$, 5$^b$ on the column standing on internal lugs 1$^e$, 1$^f$, of the base, screws 1$^g$ being passed through and uniting said lugs. Raised deck 1$^b$ on the base, together with the lugs 1$^e$, 1$^f$, provides a pedestal for the column 5. Upstanding flange 1$^d$ on the pedestal and depending skirt 5$^c$ on the column are sustained in overlapping relation by the stepping lugs, but are held out of contact with each other and with any part of the structure. The removable cover 2 fits upon the surrounding wall 1$^a$ and abuts endwise against the offset provided by the raised deck or pedestal. It is preferably of vertical dimension equal to the offset and completes the top closure of the base upon a level with said raised deck. 6 represents the T-head of the column which affords a firm foundation for the chart housing. The chart housing comprises end walls 7 which constitute dished and flanged structures of great rigidity, firmly mounted upon the T-head 6 through the medium of attaching ears 7$^a$ on the end walls screwed to supporting lugs 6$^a$ on the T-head (Figure 3); also a top bar 8 of hollow trussed construction screwed to the end walls 7 at 8$^a$, as shown in Figure 10, and thereby adapted to rigidly space the upper portions of said end walls, and having inturned longitudinal flanges 8$^b$ (Figures 4 and 11); also longitudinal side walls 9, at least one and preferably both of which are removably secured in place by interengaging their upper margins 9$^a$ with the flanges 8$^b$ of the top bar 8, and having their lower margins releasably secured by screws 8$^c$ to marginal flanges 6$^b$ of the T-head of the column which are shouldered as shown more clearly in Fig. 11 to lend vertical support to said side wall.

One of the side walls 9 may be provided with the usual windows 10 through which to observe the reading of the chart. Column 5 may be provided with a hand hole cover 11 made readily removable, as, for instance, by engaging claw 11$^a$ and spring latch 11$^b$ to afford access to the zeroizing adjustment and dash pot to be described.

The base comprises, in addition to the outer shell or base housing 1 and cover 2, a frame 12 constituting a sub-base upon which the system of levers is mounted. This frame is provided with its own supporting legs 12$^a$ through which it immediately rests upon the surface upon which the scale stands, and the sub-base thus provided supports the base housing 1 through means of screws 12$^b$, 12$^c$, passing through the sub-base frame 12 into the base housing 1, and sustains the base housing on the sub-base or frame as distinguished from suspending a lever frame in the base housing as heretofore, there being preferably one screw 12$^b$ at the middle of one end of the scale base and two screws 12$^c$ spaced apart near the other end of the scale base so that the base housing is mounted through means of a three-point support that facilitates determining its level with relation to the sub-base; and this frame or sub-base 12 constitutes the mounting for the lever system of the scale, to which end it carries a pair of fulcrum pillars 13 near the rear portion thereof, steps 14, 15 for the shipping spider 16, and a step 17 for the pendulous fulcrum crane 18. Shipping spider 16 is adapted to be secured by screws 19$^a$ to the steps 15, and by screws 21$^a$ to the spacing blocks 21 which are supported upon the steps 14 in a fixed plane above the platform and lever system, and it is then secured by screws 19, 19$^b$ to the platform 20; also by screws 22 to the main lever 23, and by screws 24 to the check or auxiliary lever 25, the portions of the spider 16 thus secured to the respective levers and to the platform being located in the respective planes in which it is desired to fix said members during shipment, and these planes being sufficiently spaced apart to keep the platform and levers out of bearing one upon the other, or upon their fulcrum bearings.

By developing the lever supporting frame of the scale into a substantial sub-base which rests directly upon the surface upon which the scale stands, and mounting the base housing upon it, it becomes possible to provide a carefully machined and designed mounting for the levers which not only establishes and maintains the relationship of the several levers with the accuracy and permanency required in a high class scale, but it becomes likewise possible to determine the level status of the lever system with relation to the surface upon which the scale stands, through means of such a carefully machined scale element, and to give to the entire working mechanism of the scale base accuracy, stability, and permanency of support which are attainable, if at all, only with extreme expense and difficulty where a lever system assembled with its frame is introduced into a base housing and suspended therein through means of lugs, the accuracy of which in cast bodies varies greatly and the faces of which are difficult to machine with accuracy. Again, by hanging the base housing upon the sub-base as distinguished from having it serve as a foundation from which all of the parts rise, it can be designed with more nearly uniform section throughout and proportionate uniformity in expansion and contraction under heat, particularly at the time of vitrifying the enamel, with which it is desirable to finish the housing. Thus, the described plan of building the scale upon a sub-base contributes largely toward the success of developing a finishing coat of enamel upon the housing of the scale. But notwithstanding the facts just stated, the base housing can, without defeating the advantages enumerated, be formed with lugs through which to hang it upon the sub-base, as well as legs which adapt it to serve as a satisfactory foundation upon which to build the upper portion of the housing, to-wit: the upstanding column upon which the counterbalancing mechanism, through the medium of a prepared standard, is directly mounted, and a housing for mounting and protecting the chart which is mounted upon the column independently of the standard of the counterbalancing mechanism, as elsewhere herein described.

The main lever, in addition to its rear frame-like portion 23 carrying knife edge bearings 26 which rest in the fulcrum pillars, comprises a forwardly extending tongue 23ª which terminates beneath the steelyard rod 27, where said tongue is equipped with knife edge 28 adapted to rest in the agate 29 carried in the sling 30 from said steelyard rod. Knife edge 28 is adjustable longitudinally of the lever 23 through the medium of a rod 31, which is controlled by thermostat 32 anchored to the rear end of the lever 23 and having its forward or movable end in connection with said rod. In order to maintain the center of gravity of the main lever 23 substantially constant, notwithstanding longitudinal adjustment of its knife edge 28, controlling rod 31, and thermostat 32, the lever is provided with counterbalances 33 pivoted thereon at 34 and so connected therewith at 35 that thermostatic adjustment throws these counterbalances in a direction opposite to that in which the other thermostatically controlled parts move, and thereby compensates for the shift in center of gravity.

The check lever 25 which coacts with the main lever 23 to support the platform 20, has a universally pendulous fulcrum 36 developed through means of a sling 37 carried by an oscillating pin 38 which is stepped in the elevated cup 39 and which leaves the check lever 25 free to move in a horizontal direction. Moreover, the pendulous nature of its fulcrum support is such, particularly with reference to the distance between the lever fulcrum and the cup bearing of the supporting pin 38 that all necessary movements of the check lever can be achieved with negligible lifting of the lever from its normal plane. Check lever 25 is connected through links 40 with knife edges 41 of the main lever 23 at points intermediate of the length of the latter, and it receives the loading platform 20 upon its knife edges 42 at a point intermediate of the pendulous fulcrum 36 and the lever connecting links 40. The bearings which support the other end of the loading platform 20 are knife edges 43 located upon the main lever 23 at points intermediate of the main lever fulcrum 26 and said lever connecting links 40. The platform bearings on each lever are two in number, spaced apart transversely of the lever system, and the lever connecting links 40 are two in number, spaced apart in the same transverse direction. This method of assembly, in combination with the universally pendulous check lever fulcrum 36, insures parallelism of lever action between the main lever and the check lever at all times, notwithstanding longitudinal, transverse, or torsional stresses in a horizontal plane.

Important features of novelty of the present invention are to be found in the relation of the platform to the bearings through which its load is distributed to the main and check levers, and also in the position of the fulcrum and particularly of the universally pendulous single point fulcrum of the check lever with relation to the main lever; and while not indispensable to the realization of the advantages of these features, the leverages through which the load acts in the respective levers disclosed in the particular embodiment of the invention herein selected for illustration, likewise contribute to the best results. That is to say, the position of the platform 4 with relation to the bearings 42, 43, through which the platform spider 20 imposes its load to the respective levers, is such that it is offset very materially in a rearward direction from the said bearings, with consequent substantial increase in the load imposed directly upon the main lever 23 through the bearing 43, and a substantial decrease in the proportion of the load which goes to the main lever indirectly through the bearing 42, check lever 45, and links 40. This develops in the platform, in a measure, the advantages of a single point support, but instead of having the parallel link connecting a depending post on the platform with a fixed point on the frame, as was formerly employed in some scale constructions, the present invention uses the forward extension of the platform spider as the balancing element, utilizes the check lever 25 to sustain the same, mounts the check lever through the links 40 on the main lever, and has the fulcrum 36 of the check lever free to float in any horizontal direction. Again, in the specific design of lever system herein shown, the bearings 42 and 43 are more remote from the fulcrums 26 and 36 of the respective levers than in designs heretofore known, with the result that the main lever is rendered very much more sensitive to changes in load and the readings of the scale correspondingly more accurate. According to this specific design, the check lever 25 is of sufficient length to permit its fulcrum 36 to be forward of the forward end of the main lever but receives the platform spider at about the middle point of its length, its rear end is connected at about the middle point of the length of the main lever, and the direct bearing of the platform spider is about mid-way between the main lever fulcrum 36 and the links 40. It is to be understood, however, that these proportions may be varied considerably without sacrificing the main features of novelty above described which characterize this lever system.

The steelyard rod 27 which connects the tongue 23ᵃ of the main lever 23 with the translating and counterbalancing mechanism is framed at 27ᵃ to admit the dash pot 44 at an intermediate position with relation thereto, and this dash pot is supported upon bracket 44ᶜ of the column 5 and presents its piston rod 44ᵃ in position for connection with the cross arm 27ᵇ of said frame. 44ᵇ represents a lock nut on the piston rod 44ᵃ, which can be screwed into the top of the dash pot cylinder in a known manner to secure the parts against motion and the liquid contents of the dash pot against waste during shipment.

45 represents the zeroizing screw which is rotatably mounted in the lower end of the section 27ᶜ of the steelyard rod with freedom of rotation but against axial displacement through means of a screw 45ᵃ, and as shown in Figure 10 this adjusting screw engages rod 46 which carries the translating rack 47 through means of pivotal connection 47ᵃ, and through pivotal connection 48ᵃ the yoke 48 which connects the steelyard rod with the counterbalance springs 49.

The translating rack bar 47 is held in engagement with the pinion 50 on the chart shaft 51 by means of the presser foot 52 embracing the same through its grooved end 52ᵃ, pivoted at 53 upon the counterbalance standard 54, and is held rigidly and adjustably to position by means of the spacing screw 55 and the locking screw 56.

Rack bar 47 and presser foot 52 are located on the opposite side of the shaft 51 from a movable side panel 9 of the chart housing, and the spring 49 which lies in front of said shaft 51 is releasably connected at 49ᵃ with the yoke 48 so that it can readily be removed from position obstructing the removal of the chart. It will thus be seen that shaft 51 is readily removable once it is released from its bearings. Shaft 51 has its bearings 57 adjustable axially in the end walls 7 of the chart housing, and secured to adjustment by means of set screw 58.

59 represents a screw cap for closing the opening over the bearing 57, and this cap carries a finishing escutcheon 60 which will ordinarily bear an insignia identifying the machine, and for that reason is connected with the plug 59 through means of the plunger 61 and spring 62 which permit the escutcheon to yield axially relatively to the plug 59 and consequent rotation of the escutcheon and plug until the insignia is presented in correct position for reading or observation.

The counterbalance standard 54 comprises two oppositely presented pairs of arms 54ᵃ and 54ᵇ united by a web 54ᶜ and rising from four symmetrically disposed steps 63 on the column 5 so that said standard is held with great rigidity and accuracy. The standard is cut away at 64 on the side toward the shaft 51 of the chart, so as to leave said shaft free to move laterally into and out of driving relation to the translating rack 47, and to and from the chart housing when a side wall of the latter is opened or removed and the obstructing counterbalance spring has been disconnected, for instance, at 49ᵃ (Fig. 4).

The links 40 which connect the levers, as shown more clearly in Figure 5, are sustained against displacement from the knife edges 41 of the main lever 23 by the upturned ends 41ᵃ of the knife edge member, and as shown in Figures 6 and 8, the knife edge is continued in these upturned ends 41ª so as to reduce to a minimum friction between the links and said members.

I claim:

1. In a scale, a base casing, a chart housing, and a column supporting the chart housing upon the base casing; said column and base casing being provided with internal stepping lugs supporting the vertical load and holding the edges of the walls of said parts out of bearing.

2. In a scale, a casing comprising a base, a column mounted on said base, and a chart housing mounted on said column; said column being constructed with a head; and said chart housing comprising end walls supported on said head, a top bar supported on said end walls, and side walls in engagement with said top bar and said head.

3. In a scale, a casing comprising a base, a column mounted on said base, and a chart housing mounted on said column; said column being constructed with a T-head; and said chart housing comprising end walls supported on said T-head, a top bar supported on said end walls, and side walls in engagement with said top bar and said T-head; the end walls and T-head being connected by internal bearing portions which hold the edges and opposed surfaces of said parts out of impingement one against the other.

4. In a scale, a casing comprising a base, a column mounted on said base, and a chart housing mounted on said column; said column being constructed with a T-head; and said chart housing comprising end walls supported on said T-head, a top bar supported on said end walls, and side walls in engagement with said top bar and said T-head; and said side walls being releasably interengaged with said top bar and releasably attached to longitudinal margins of said T-head.

5. In a scale, a casing comprising a base, a column mounted on said base, and a chart housing mounted on said column; said column being constructed with a T-head; said chart housing comprising end walls supported on said T-head, a top bar supported on said end walls, and side walls in engagement with said top bar and said T-head; said chart housing containing a revoluble chart; and said end walls carrying bearings therefor.

6. In a scale, a base, a column mounted on said base and constructed with a T-head, a chart housing mounted on said T-head, a chart within said housing, a counterbalancing mechanism intersecting longitudinal lines of said chart, and a counterbalance standard supporting said counterbalance and mounted directly upon the column.

7. In a scale, a base, a column mounted on said base and constructed with a T-head, a chart housing mounted on said column and comprising intermediately spaced chart units, a translating device interposed between said chart units and having driving connection with said chart, a counterbalance located between said chart units, and a counterbalance standard mounted directly upon the T-head of the column, extending upwardly between the chart units, controlling said translating device, and supporting said counterbalance.

8. In a scale, a base housing constructed with a deck and with supporting lugs located inwardly from said deck, and a column rising from said deck and having stepping lugs through which it is mounted on said supporting lugs; said deck and column being constructed with flanges held in overlapping relation by said lugs.

9. In a scale, a main lever, a check lever coacting with said main lever, a fulcrum for said check lever, and a support for said fulcrum comprising a pendulous member and a single point support for said pendulous member elevated above said fulcrum.

10. In a platform scale lever system, a main lever, a check lever mounted on said main lever, a fulcrum for said check lever, and a support for said fulcrum comprising a pendulous member and a single pin bearing for said pendulous member elevated a substantial distance above said fulcrum.

11. In a scale, a main lever, a compensating lever having transversely spaced connections with said main lever, a platform having a pair of transversely spaced bearings upon each of said levers and tending to hold them in alignment, and a universally pendulous fulcrum for said compensating lever.

12. In a scale, a pair of levers, and a universally pendulous fulcrum for one of said levers comprising an elevated bearing, a pointed pin in said bearing, and a sling depending from said pointed pin and carrying said fulcrum.

13. In a platform scale, a main lever fulcrumed at its rear end and having a transmitting connection at its forward end, a check lever fulcrumed at its fore end and connected at its rear end with an intermediate portion of the main lever, a platform spider having bearings upon and distributing its weight between the two levers named, and a platform carried by said spider unsymmetrically with relation to the bearing of the spider upon the levers and transmitting a substantially greater portion of the platform load through the bearing of the spider on the main lever than is transmitted to the check lever.

14. In a platform scale, a main lever fulcrumed at its rear end and having a transmitting connection at its forward end, a check lever fulcrumed at its forward end and connected at its rear end with an intermediate portion of the main lever, and a platform spider bearing upon the check lever between the fulcrum of the check lever and its said connection with the main lever, and bearing upon the main lever between the fulcrum of the main lever and the said connection of the check lever; said spider being offset rearwardly from its bearing on the main lever, and being thereby adapted to impose a substantially greater fraction of its load directly on the main lever than is imposed indirectly thereon through its bearing upon the check lever.

15. In a platform scale, a main lever fulcrumed at its rear end and having a transmitting connection at its forward end, a check lever fulcrumed at its forward end and having connection at its rear end with an intermediate portion of the main lever, and a platform spider transmitting load directly to the main lever and also indirectly thereto through the check lever; the bearing of the spider upon the check lever being offset forwardly from the body of the platform spider a distance sufficient to substantially reduce the fraction of the platform load imposed through the check lever in proportion to that imposed directly upon the main lever.

16. In a platform scale, a main lever fulcrumed at one end and having a transmitting connection at its other end, a check lever fulcrumed at one end and having at its other end connection with an intermediate portion of the main lever, and a platform spider having a direct bearing upon the main lever and having a bearing upon the check lever through which it indirectly transmits load to the main lever; the body of the spider being offset rearwardly from its bearings upon the main lever and check lever, thereby imposing a greater fraction of its load directly upon the main lever and transmitting a lesser fraction thereof indirectly through the check lever.

17. In a platform scale, a main lever, a check lever transmitting load to the main lever, and a platform spider bearing upon both said levers: said platform spider having bearing upon said main lever forward of the rear end of said platform spider through which it balances a greater part of its load on said main lever, and having a forward extension through which it bears upon said check lever and by which it counterbalances said load even when the load is placed in rear of said bearing upon the main lever.

18. In a platform scale, a main lever fulcrumed at its rear end and having a transmitting connection at its forward end, a check lever fulcrumed at its forward end and having its rear end connected with an intermediate portion of the main lever, and a platform spider resting upon the respective levers; the fulcruming end of the check lever being located forward of the forward end of the main lever; the connection of the main lever with the check lever being at about the middle point of the main lever; the bearing of the spider upon the main lever being substantially equidistant from the fulcrum of said lever and its connection with the check lever; and the bearing of the spider upon the check lever being at substantially the middle point of the latter.

19. In a platform scale, a mounting, a plurality of levers, bearings for said levers, and a shipping spider having a plurality of supports upon said mounting and a plurality of connections with each of said levers adapted to lift each lever and define its position in a fixed plane out of contact with its bearings.

20. In a platform scale, a mounting, a plurality of levers, bearings for said levers, and a shipping spider having a plurality of supports upon said mounting and a plurality of connections with each of said levers adapted to lift each lever and define its position in a fixed plane out of contact with its bearings; the connections between the shipping spider and each lever being independent of its other connections.

21. In a weighing scale, the combination of a sub-base constructed to stand immediately upon a supporting surface, a lever system mounted upon and receiving its vertical support through the medium of said sub-base, a base housing supported on said sub-base, and weighing mechanism supported above said sub-base through the medium of said base housing.

22. In a weighing scale, the combination of a sub-base constructed to rest immediately upon a supporting surface, a lever system having bearings carried immediately by said sub-base, a base housing mounted upon and receiving its vertical support through the medium of said sub-base, an upper housing receiving its vertical support from said sub-base through the medium of said base housing, and weighing mechanism mounted in said upper housing.

23. In a weighing scale, the combination of a sub-base having means through which it rests directly upon a supporting surface, a lever system and a base housing mounted upon said sub-base independently of each other, a housing column upstanding from said base housing and receiving its vertical support from the sub-base through the medium of said base housing, and weighing mechanism mounted upon said column.

24. In a weighing scale, the combination of a sub-base having means through which it rests directly upon a supporting surface, a lever system and a base housing mounted upon said sub-base independently of each other, a housing column upstanding from said base housing and receiving its vertical support from the sub-base through the medium of said base housing, weighing mechanism, and a supporting standard for said weighing mechanism mounted immediately upon said column.

25. In a weighing scale, the combination of a sub-base having means through which it rests directly upon a supporting surface, a lever system and a base housing mounted upon said sub-base independently of each other, a housing column upstanding from said base housing and receiving its vertical support from the sub-base through the medium of said base housing, weighing mechanism, a standard upon which said weighing mechanism is mounted and which is supported directly upon said column, a chart, and a chart housing supported upon said column independently of said weighing mechanism and its standard.

Signed at Chicago, Illinois, this 8th day of February, 1922.

GEORGE M. LUDLOW.